(12) United States Patent
Martinez (10) Patent No.: US 12,325,187 B2
(45) Date of Patent: Jun. 10, 2025

(54) PIEZOELECTRIC ACTUATED 3D-PRINTING NOZZLE AND METHODS OF TOOL TOUCH-OFF

(71) Applicant: Honeywell Federal Manufacturing & Technologies, LLC, Kansas City, MO (US)

(72) Inventor: Nikki Lee Martinez, Lee's Summit, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/464,880

(22) Filed: Sep. 11, 2023

(65) Prior Publication Data

US 2025/0083382 A1  Mar. 13, 2025

(51) Int. Cl.
*B29C 64/209*   (2017.01)
*B29C 64/295*   (2017.01)
(Continued)

(52) U.S. Cl.
CPC .......... *B29C 64/209* (2017.08); *B29C 64/295* (2017.08); *B29C 64/393* (2017.08);
(Continued)

(58) Field of Classification Search
CPC ... B29C 64/118; B29C 64/209; B29C 64/295; B29C 64/386; B29C 64/393; B33Y 50/00; B33Y 50/02
See application file for complete search history.

(56) References Cited

U.S. PATENT DOCUMENTS 9,321,270 B2    4/2016  Kim et al.
2015/0314604 A1* 11/2015 Kim .................. B41J 2/165
                                                              347/27
(Continued)

FOREIGN PATENT DOCUMENTS

CN    106725999 A    5/2017
CN    111055492 A    4/2020

OTHER PUBLICATIONS

RepRap, Piezo-electric sensors, Apr. 12, 2017 (date of last edit, accessed Feb. 24, 2024), https://reprap.org/wiki/Piezo-electric_sensors (Year: 2017).*

(Continued)

*Primary Examiner* — Andrew L Swanson
(74) *Attorney, Agent, or Firm* — Erise IP, P.A.

(57) ABSTRACT

A piezoelectric printhead having a printing nozzle, and a piezoelectric transducer mounted in-line with the printing nozzle is disclosed. The piezoelectric transducer may apply vibration to the printing nozzle that is in-line with the flow of print material through the nozzle. The vibration applied to the printing nozzle may prevent agglomeration of print material as the print material flows through the nozzle by introducing heat to the print material and providing acoustic vibration to the print material, thereby reducing the viscosity of the print material. Additionally, the piezoelectric transducer may be used to set a Z-zero by contacting the nozzle with the print surface, which may generate a voltage change in the piezoelectric transducer. Z-zero may then be set responsive to detecting the voltage change.

19 Claims, 4 Drawing Sheets

(51) Int. Cl.
*B29C 64/393* (2017.01)
*B29C 64/118* (2017.01)
*B33Y 10/00* (2015.01)
*B33Y 30/00* (2015.01)
*B33Y 50/02* (2015.01)

(52) U.S. Cl.
CPC ............. *B29C 64/118* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2018/0236713 A1* | 8/2018 | Robert | B33Y 40/00 |
| 2018/0326660 A1* | 11/2018 | Gifford | B29C 64/241 |
| 2019/0202116 A1* | 7/2019 | Hsu | B29C 64/20 |
| 2022/0055300 A1 | 2/2022 | Gifford et al. | |

OTHER PUBLICATIONS

DjDemond, MK III Piezo Hotend z-probe for e3d v6 + Magnetic Delta Piezo Effector, Jan. 28, 2017 (accessed Feb. 24, 2024), UlitMaker Thingiverse, https://www.thingiverse.com/thing:2069480 (Year: 2017).*

* cited by examiner

PIEZOELECTRIC ACTUATED 3D-PRINTING NOZZLE AND METHODS OF TOOL TOUCH-OFF

STATEMENT OF GOVERNMENT SUPPORT

This invention was made with government support under Contract No.: DE-NA-0002839 awarded by the United States Department of Energy/National Nuclear Security Administration. The government has certain rights in the invention.

BACKGROUND

1. Field

Embodiments of the present disclosure relate to systems and methods for additive manufacturing. More specifically, embodiments of the present disclosure relate to applying vibrations to an additive manufacturing nozzle along a longitudinal axis of the additive manufacturing nozzle using piezoelectric transducers.

2. Related Art

Piezoelectric transducers and other vibration devices are added to additive manufacturing devices to prevent agglomeration of print material flowing through the nozzle of the additive manufacturing device. For example, it is desirable to add filler to print material to adjust the properties of printed parts. However, the filler can lead to clogging of the nozzle. The likelihood of nozzle clogging increases as filler is added. Typically, piezoelectric transducers mounted to additive manufacturing devices are mounted such that vibrations act perpendicularly to the nozzle. This positioning results in the piezoelectric vibrations being applied perpendicularly through only a portion of the additive manufacturing nozzle, which causes agglomeration of print material flowing through the nozzle. Further, perpendicular vibrations cause the additive manufacturing nozzle to deflect horizontally resulting in inaccuracies of the printed part, which cause additive manufacturing errors such as poor bed adhesion, inaccurate print lines, and/or holes and other defects.

Additionally, tool touch-off for additive manufacturing is typically done by contacting a conductive element with a conductive print surface. The conductive element is separate from the piezoelectric printhead and may not be accurate when determining the print surface height of an additive manufacturing device. Inaccuracies in touch-off may result in poor bed adhesion, failed prints, and skipped layers. Tool touch-off may also be performed using the nozzle. However, when either the nozzle and/or the print surface are non-conductive, automated tool touch off cannot be performed.

SUMMARY

Embodiments of the present disclosure solve the above-mentioned problems by providing a systems and methods for additive manufacturing using integrated piezoelectric transducers and additive manufacturing nozzles, wherein the piezoelectric transducer may be in line (e.g., coaxial) with the additive manufacturing nozzle. The piezoelectric transducer may apply vibrations to the nozzle. Because the piezoelectric transducer is in-line with the nozzle, the vibrations may be applied codirectionally with the flow of the print material, which may aid in extruding the print material out of the nozzle. Embodiments of the present disclosure are also directed to automating tool touch off When the nozzle contacts a print surface, a voltage change may be created across the piezoelectric transducer. Responsive to detecting the voltage change, a control signal may be generated to set Z-zero for the coordinate system of an additive manufacturing device.

In some embodiments, the techniques described herein are directed to a system for additive manufacturing, including: a piezoelectric printhead having a length along a vertical axis, including: a piezoelectric transducer configured to cause a longitudinal vibration along the vertical axis; and a nozzle oriented along the vertical axis and disposed through the piezoelectric transducer, wherein the nozzle is configured to receive and extrude a print material, and wherein the longitudinal vibration caused by the piezoelectric transducer prevents agglomeration of the print material while the print material is received within the nozzle; and a print surface disposed proximate the piezoelectric printhead for receipt of the extruded print material; and a controller associated with an additive manufacturing device, wherein the controller is configured to: position the piezoelectric printhead to contact the print surface; and responsive to detecting a voltage increase caused by the nozzle contacting the print surface, setting a reference value corresponding to a position of the nozzle upon detecting the voltage increase.

In some embodiments, the techniques described herein are directed to a system, wherein the piezoelectric transducer vibrates ultrasonically.

In some embodiments, the techniques described herein are directed to a system, wherein the print material is a polymer material including a filler.

In some embodiments, the techniques described herein are directed to a system, wherein the piezoelectric printhead further includes a heating element coupled to the nozzle, the heating element configured to apply heat to the nozzle to reduce a viscosity of the print material.

In some embodiments, the techniques described herein are directed to a system, wherein vibrating along the vertical axis causes van der Waals force between the nozzle and the print material to stretch and compress polymeric fibers within the print material, thereby reducing viscosity of the print material.

In some embodiments, the techniques described herein are directed to a system, wherein the nozzle includes an electrically non-conductive tip, and wherein the print surface is electrically non-conductive.

In some embodiments, the techniques described herein are directed to a system, wherein the piezoelectric printhead is configured to be coupled to a gantry of an additive manufacturing device.

In some embodiments, the techniques described herein are directed to a method for additive manufacturing, including: providing a piezoelectric printhead, the piezoelectric printhead including: a piezoelectric transducer configured to cause a longitudinal vibration along a vertical axis; and a nozzle oriented along the vertical axis and disposed through the piezoelectric transducer; the nozzle including: an extruding end protruding from the piezoelectric transducer and configured to deposit print material onto a build surface; a mounting end configured to mount to an additive manufacturing device; and a medial section disposed between the extruding end and the mounting end; in response to the piezoelectric printhead contacting the build surface, determining a voltage increase across the piezoelectric transducer, the voltage increase resulting from contacting the build surface; and setting, in response to the voltage increase, a position value indicating a current height of the piezoelectric printhead relative to the build surface.

In some embodiments, the techniques described herein are directed to a method, wherein determining the voltage increase includes: monitoring the piezoelectric transducer for changes in voltage compared to a background noise level; and storing the changes in voltage compared to the background noise level in non-transitory computer-readable memory.

In some embodiments, the techniques described herein are directed to a method, wherein the piezoelectric transducer operates at an ultrasonic frequency, and wherein the ultrasonic frequency is selected based on a resonant frequency of the nozzle.

In some embodiments, the techniques described herein are directed to a method, further including: receiving a print material in the nozzle; and depositing the print material on the build surface.

In some embodiments, the techniques described herein are directed to a method, further including applying a vibration to the nozzle by the piezoelectric transducer.

In some embodiments, the techniques described herein are directed to a method, wherein the build surface and the extruding end of the nozzle are electrically non-conductive.

In some embodiments, the techniques described herein are directed to a system for additive manufacturing, including: a piezoelectric transducer configured to cause vibration along a vertical axis thereof, the piezoelectric transducer having a bore extending along the vertical axis; and a nozzle oriented along the vertical axis and received within the bore of the piezoelectric transducer, wherein the nozzle is configured to deposit print material along the vertical axis such that the first direction of the print material is in-line with a second direction of vibrations of the piezoelectric transducer.

In some embodiments, the techniques described herein are directed to a system, further including a controller associated with an additive manufacturing device, wherein the controller is configured to: cause lowering of the nozzle to contact a print surface; and responsive to detecting a voltage increase in the piezoelectric transducer caused by the nozzle contacting the print surface, set a reference value corresponding to a position of the nozzle upon detecting the voltage increase.

In some embodiments, the techniques described herein are directed to a system, wherein the piezoelectric transducer includes a plurality of piezoelectric transducers; and wherein the plurality of piezoelectric transducers is oriented symmetrically about a perimeter of the nozzle to provide vibrations in-line with the nozzle.

In some embodiments, the techniques described herein are directed to a system, further including at least one heating element coupled to the nozzle to heat print material extruded through the nozzle.

In some embodiments, the techniques described herein are directed to a system, wherein the piezoelectric transducer comprises at least one piezoelectric ceramic, and wherein the at least one piezoelectric ceramic is thermally insulated from the nozzle.

In some embodiments, the techniques described herein are directed to a system, wherein the piezoelectric transducer includes a threaded bore, and wherein the nozzle includes a medial section threaded to interface with the threaded bore of the piezoelectric transducer.

In some embodiments, the techniques described herein are directed to a system, wherein the piezoelectric transducer is electronically controlled by a computer system communicatively coupled to the additive manufacturing device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of the present disclosure are generally directed to a piezoelectric printhead for additive manufacturing, which may comprise an additive manufacturing nozzle coupled to a piezoelectric transducer. The piezoelectric transducer may comprise a bore for receiving the nozzle such that the transducer may apply vibrations to the nozzle. The piezoelectric transducer may be configured to cause vibration of the additive manufacturing nozzle along a longitudinal axis of a central channel of the additive manufacturing nozzle through which print material flows. In some embodiments, the piezoelectric transducer applies ultrasonic vibrations to the additive manufacturing nozzle and print material flowing through the additive manufacturing nozzle. The ultrasonic vibrations may prevent and/or reduce agglomeration of the print material, prevent and/or reduce clogging of the additive manufacturing nozzle, and lower the viscosity of the print material, among other benefits. In particular, the vibrations applied to the additive manufacturing nozzle by the piezoelectric transducer may be applied substantially in-line with the additive manufacturing nozzle. The vibrations may be applied in-line with the additive manufacturing nozzle such that vibrations are substantially parallel to the longitudinal axis of the additive manufacturing nozzle. To state another way, the vibrations may be codirectional with the flow of print material through the nozzle. Applying the piezoelectric vibrations in-line with the additive manufacturing nozzle prevents the nozzle from deflecting away from a predetermined print path during additive manufacturing. The additive manufacturing nozzle may be coupled to a heating element configured to heat the additive manufacturing nozzle.

Piezoelectric Additive Manufacturing Printhead

Figure 1A:
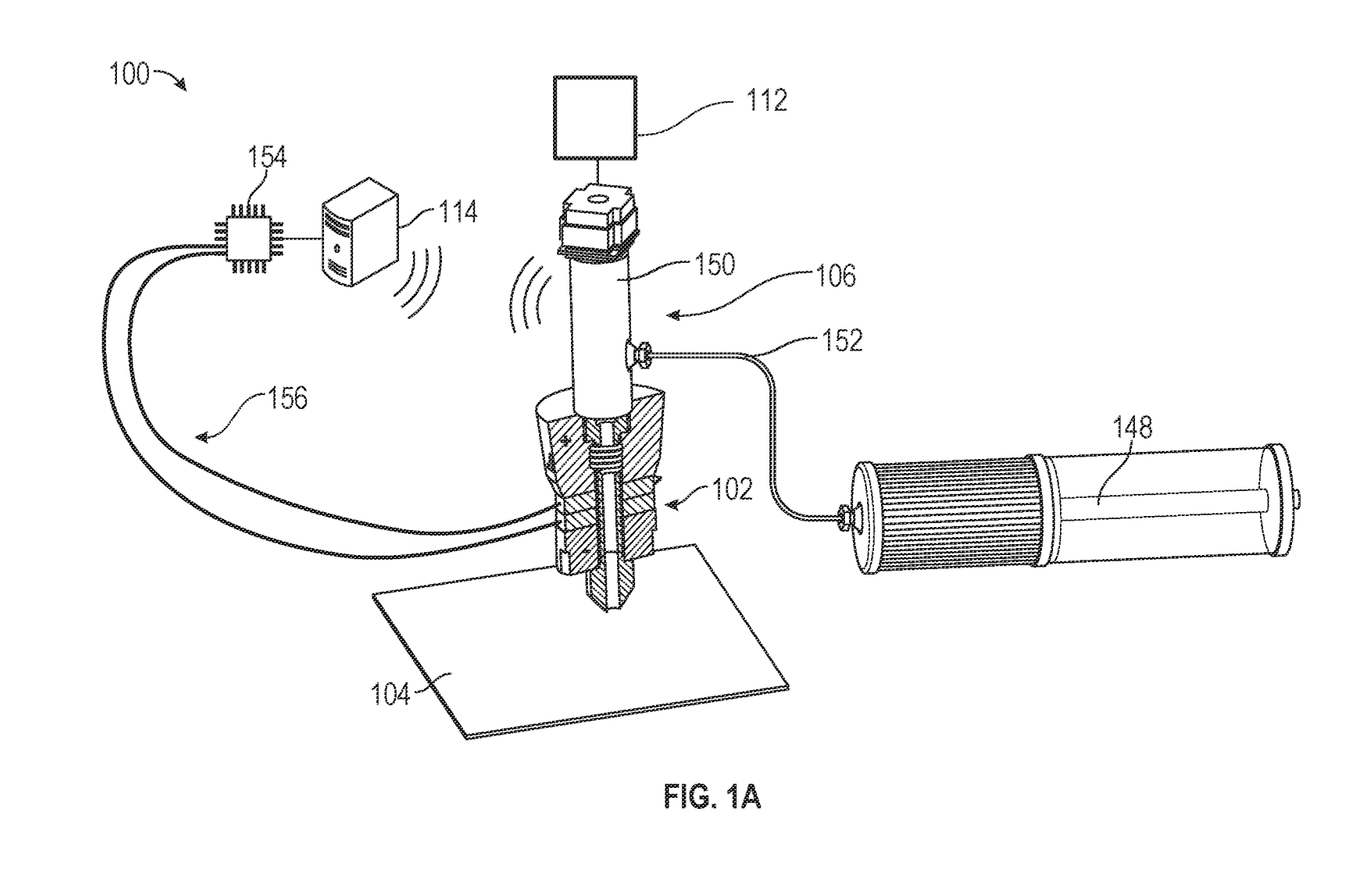
FIG. 1A illustrates a system for additive manufacturing comprising a piezoelectric printhead, a build surface, and an additive manufacturing device for some embodiments.
Figure 1B:
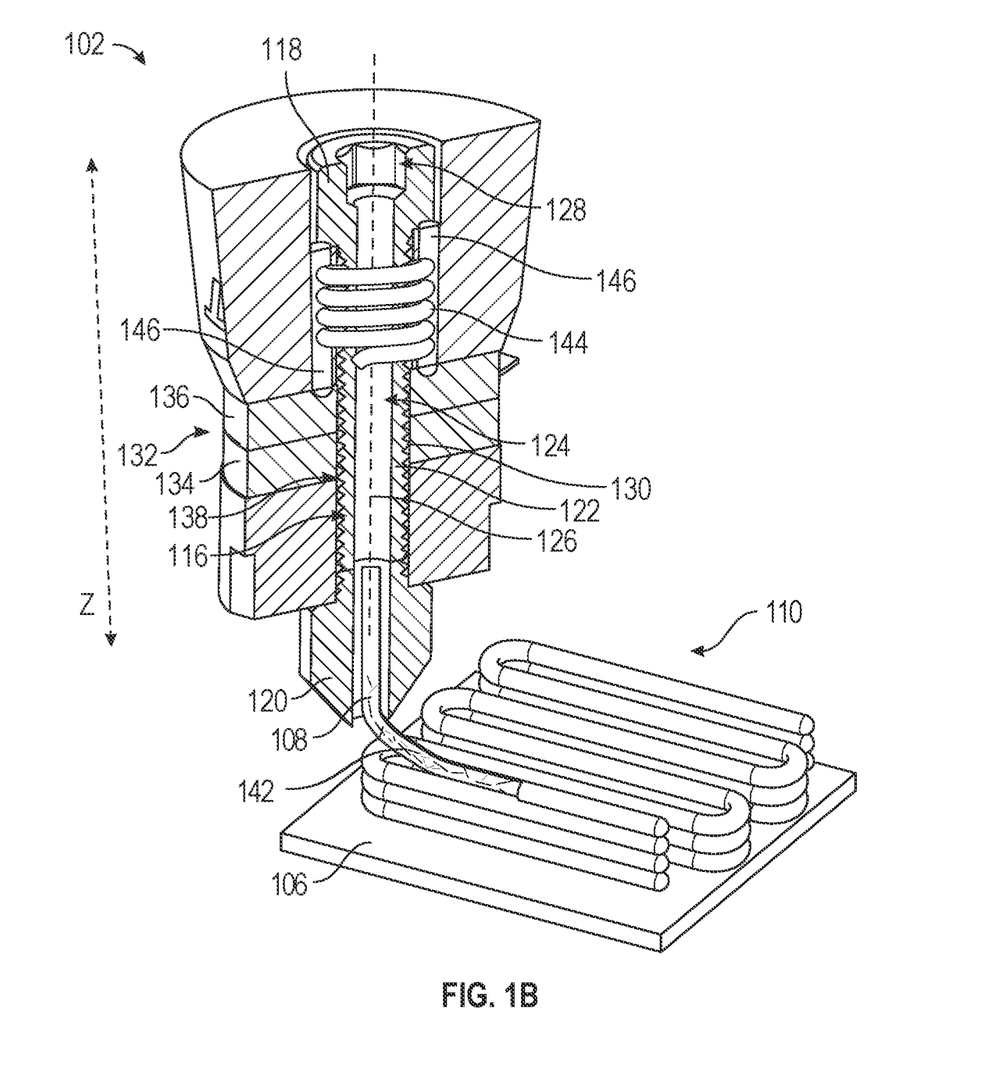
FIG. 1B illustrates a closeup of the piezoelectric printhead for some embodiments.
Figure 1C:
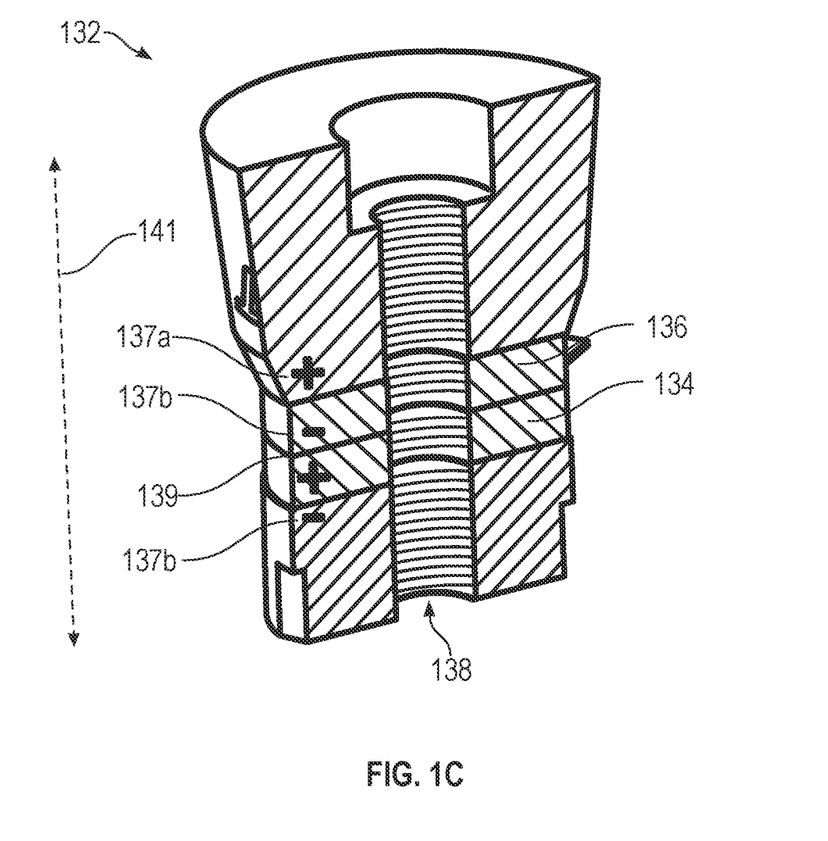
FIG. 1C illustrates a piezoelectric transducer with piezoelectric ceramics for some embodiments.

FIGS. 1A-1C illustrate a system 100 for additive manufacturing comprising a piezoelectric printhead 102, a build surface 104, and an additive manufacturing device 106 for some embodiments. In some embodiments, system 100 extrudes print material 108 to additively manufacture three dimensional structures, such as 3D-structure 110, on build surface 104. In some embodiments, system 100 is used to additively manufacture conductive traces on build surface 104. Piezoelectric printhead 102 is coupled to an additive manufacturing device gantry 112 of additive manufacturing device 106. In some embodiments, piezoelectric printhead 102 is removably attachable to additive manufacturing device 106. In some embodiments, build surface 104 is integrated into additive manufacturing device 106. In some embodiments, build surface 104 is separate from additive manufacturing device 106. In some embodiments, additive manufacturing device 106 is communicatively coupled to computer 114.

Piezoelectric printhead 102 comprises additive manufacturing nozzle 116 for extruding print material 108. Additive manufacturing nozzle 116 may comprise a mounting head 118 and extruding end 120 at opposite longitudinal ends of additive manufacturing nozzle 116. Additive manufacturing nozzle 116 may further comprise a medial section 122 between mounting head 118 and extruding end 120. In some embodiments, medial section 122 is not present and mounting head 118 is coupled to extruding end 120. In some embodiments, additive manufacturing nozzle 116 is monolithic. In some embodiments, one or more of mounting head 118, extruding end 120, or medial section 122 are discrete components coupled together to form additive manufacturing nozzle 116. In some embodiments, additive manufacturing nozzle 116 comprises steel, titanium, ceramics, and/or any material capable of resisting high temperature and constant ultrasonic acoustic vibration. In some embodiments, all, or part of additive manufacturing nozzle 116 may be electrically conductive or electrically non-conductive. Additive manufacturing nozzle 116 further comprises a channel 124 through which print material 108 may flow and be deposited out of mounting head 118. Channel 124 may extend through mounting head 118, extruding end 120, and/or medial section 122 or any combination thereof.

In some embodiments, channel 124 extends along a length of additive manufacturing nozzle 116. In some embodiments, channel 124 extends through a center of additive manufacturing nozzle 116. In some embodiments, channel 124 extends along longitudinal axis 126. In some embodiments, channel 124 is coaxial with longitudinal axis 126. In some embodiments, channel 124 comprises a smooth surface to allow print material 108 to flow through channel 124 without obstruction. In some embodiments, channel 124 may be heated to reduce the viscosity of the print material flowing through channel 124. In some embodiments, channel 124 may extend from mounting head 118 to extruding end 120. In some embodiments, channel 124 is configured to receive print material 108. In some embodiments, the print material is received into channel 124 through mounting head 118.

In some embodiments, mounting head 118 is configured to couple additive manufacturing nozzle 116 to additive manufacturing device 106. For example, mounting head 118 may comprise a hexagonal recess 128 matching a hexagonal protrusion of the additive manufacturing device 106 (e.g., a hexagonal protrusion of additive manufacturing device gantry 112). Generally, mounting head 118 may take any geometry for coupling to additive manufacturing device 106. In some embodiments, mounting head 118 may be detachable from the additive manufacturing device 106. In some embodiments, mounting head 118 is absent and additive manufacturing nozzle 116 may be attached to additive manufacturing device 106 by medial section 122.

In some embodiments, extruding end 120 may be configured to deposit print material 108 on build surface 104. In some embodiments, extruding end 120 may comprise an erosion and/or heat-resistant material similar to the materials described with respect to additive manufacturing nozzle 116 above. In some embodiments, extruding end 120 may have an increased outer diameter relative to the rest of additive manufacturing nozzle 116 for heat retention. In some embodiments, extruding end 120 may be electrically non-conductive. For example, extruding end 120 may comprise a ruby tip, which provides high heat conductivity and wear resistance and is electrically non-conductive. In some embodiments, extruding end 120 is partially ruby and partially a heat-resistant material. In some embodiments, extruding end 120 comprises a ruby tip, titanium, stainless steel, aluminum, or any combination thereof.

In some embodiments, additive manufacturing nozzle 116 comprises a medial section 122 between extruding end 120 and mounting head 118. In some embodiments, medial section 122 has a smaller outer diameter than both an outer diameter of extruding end 120 and an outer diameter of mounting head 118. In some embodiments, the outer diameter of medial section 122 is equal to, or greater than, the outer diameter of extruding end 120 and mounting head 118. In some embodiments, medial section 122 comprises a threaded exterior 130 for threadedly engaging with corresponding threads on piezoelectric transducer 132 as illustrated in FIG. 1C. In some embodiments, extruding end 120 may be removably attachable to medial section 122 and may, for example, be configured to threadedly interface with medial section 122 to attach and detach extruding end 120 to and from medial section 122.

Piezoelectric printhead 102 comprises piezoelectric transducer 132 coupled to additive manufacturing nozzle 116. Piezoelectric transducer 132 may be coupled to additive manufacturing nozzle 116 such that vibrating piezoelectric transducer 132 vibrates additive manufacturing nozzle 116. In some embodiments, piezoelectric transducer 132 applies vibrations along a longitudinal axis 126 (see FIG. 1B.) of additive manufacturing nozzle 116 thereby vibrating print material 108 along longitudinal axis 126. In some embodiments, piezoelectric transducer 132 causes vibration of additive manufacturing nozzle 116 at an angle of 5°, 10°, 15°, or any angle therebetween with respect to longitudinal axis 126 of additive manufacturing nozzle 116.

In some embodiments, piezoelectric transducer 132 may comprise a first piezoelectric ceramic 134 and second piezoelectric ceramic 136 that deflect away from an original shape when a voltage is applied. First piezoelectric ceramic 134 and second piezoelectric ceramic 136 may each be configured to return to the original shape after the voltage is removed. Repeated application of the voltage to first piezoelectric ceramic 134 and second piezoelectric ceramic 136 causes repeated deflections (i.e., oscillations) of both first piezoelectric ceramic 134 and second piezoelectric ceramic 136 which causes longitudinal vibrations along longitudinal axis 126. The longitudinal axis 126 may correspond to (e.g., be coaxial with) a polarization axis 141 of the ceramics 134, 136. In some embodiments, first piezoelectric ceramic 134 and second piezoelectric ceramic 136 each comprise lead zirconate titanate. It is contemplated herein that there may be any number of piezoelectric ceramics 134, 136 (e.g., less than two or greater than two) without departing from the scope of the present disclosure. In some embodiments, first piezoelectric ceramic 134 and second piezoelectric ceramic 136 are arranged in a stack orientation (e.g., an orientation where ceramics 134 and 136 are stacked by contacting a top surface of first piezoelectric ceramic 134 and a bottom surface of second piezoelectric ceramic 136) as depicted in FIGS. 1A-1C. Any number of piezoelectric ceramics may be arranged in a stack orientation without departing from the scope of the present disclosure. Additionally, it is contemplated that ceramics 134 and 136 and/or any other piezoelectric ceramics may be stacked in any order without departing from the scope of the present disclosure.

In some embodiments, first piezoelectric ceramic 134 and second piezoelectric ceramic 136 may be separated by a positive electrode 137a, a negative electrode 137b, and an electrical insulation layer 139 disposed between adjacent electrodes 137a, 137b. It will be appreciated that positive electrode 137a may include a plurality of positive electrodes and negative electrode 137b may include a plurality of negative electrodes. In some embodiments, a positive electrode 137a is disposed on top of each ceramic 134, 136 and a negative electrode 137b is disposed below each ceramic 134, 136 (e.g., abutting a bottom surface of ceramic 134, 136).

As discussed previously, piezoelectric transducer 132 may be arranged in a stack. In some embodiments, the stack is arranged, ordered from bottom to top, comprising negative electrode 137b on a top surface of first piezoelectric ceramic 134, positive electrode 137a on a bottom surface of first piezoelectric ceramic 134, an electrical insulation layer 139 between the first positive electrode 137a and a second negative electrode 137b that is on a top surface of the second piezoelectric ceramic 136, and a second positive electrode 137a on a bottom surface of the second piezoelectric ceramic 136. Additional ceramics may be stacked similarly, e.g., if a third ceramic was added below the second ceramic 136, a second insulation layer would separate the second positive electrode 137a from a third negative electrode 137b on a top surface of the third electrode. In some embodiments, the uppermost and bottommost electrodes 137a, 137b in a stack are insulated from the adjacent materials. In some embodiments, each of electrodes 137a, 137b is coupled directly to either first piezoelectric ceramic 134 or second piezoelectric ceramic 136. Each of electrodes 137a, 137b may be electrically isolated from any other electrodes 137a, 137b. For example, negative electrode 137b associated with first piezoelectric ceramic 134 may be electrically isolated from a positive electrode 137a associated with second piezoelectric ceramic 136 by electrical insulation layer 139 disposed between negative electrode 137b and positive electrode 137a. In some embodiments, electrical insulation layer 139 may comprise plastic, ceramics, glass, polymers, polytetrafluoroethylene (PTFE), or any other such electrically insulating material.

In some embodiments, piezoelectric transducer 132 may comprise a bore 138 configured to receive additive manufacturing nozzle 116 therethrough. For example, bore 138 extends through first piezoelectric ceramic 134 and second piezoelectric ceramic 136. In some embodiments, bore 138 may be internally threaded to threadedly engage with medial section 122 via threaded exterior 130. In some embodiments, bore 138 extends along the length of longitudinal axis 126. In some embodiments, bore 138 is unthreaded and additive manufacturing nozzle 116 rests within bore 138. In some embodiments, a friction fit, removable fasteners, or the like may be used to secure piezoelectric transducer 132 to additive manufacturing nozzle 116. In some embodiments, extruding end 120 protrudes from bore 138 of piezoelectric transducer 132.

While a single piezoelectric transducer 132 is shown, in some embodiments, a plurality of piezoelectric transducers 132 may be coupled to the additive manufacturing nozzle 116. In some embodiments, the plurality of piezoelectric transducers 132 is mounted parallel to additive manufacturing nozzle 116. In some embodiments, the plurality of piezoelectric transducers 132 may be mounted symmetrically about additive manufacturing nozzle 116 such that the piezoelectric vibrations introduced by the plurality of piezoelectric transducers 132 are parallel with longitudinal axis 126. For example, the plurality of piezoelectric transducers 132 may be mounted radially around additive manufacturing nozzle 116. That is, if the plurality of piezoelectric transducers 132 comprises three piezoelectric transducers 132, a perimeter of additive manufacturing nozzle 116 may be divided into three equal sections and a piezoelectric transducer 132 may be mounted at each point the circumference is divided. The same process may be followed for any number of piezoelectric transducers 132 (i.e., four piezoelectric transducers coincide with four equal sections, etc.). Accordingly, each of the plurality of piezoelectric transducers 132 may provide substantially equal vibrations to avoid unbalanced introduction of piezoelectric vibrations. In some embodiments, the plurality of piezoelectric transducers 132 is mounted in a single plane (e.g., a plane in the Z-axis) such that each of the plurality of piezoelectric transducers 132 have the same height.

In some embodiments, a pulse-width modulation (PWM) signal may be applied to piezoelectric transducer 132 to generate vibrations by repeatedly deflecting first piezoelectric ceramic 134 and/or second piezoelectric ceramic 136. In some embodiments, piezoelectric transducer 132 may be actuated by applying a voltage across positive electrode 137*a* and negative electrode 137*b* of ceramics 134 and 136. Positive electrode 137*a* and negative electrode 137*b* may be positive and negative poles of ceramics 134 and 136 as shown in FIG. 1C (i.e., the + and − symbols on piezoelectric transducer 132). In some embodiments, first piezoelectric ceramic 134 and second piezoelectric ceramic 136 are each coupled to a positive electrode 137*a* and a negative electrode 137*b*. Electrodes 137*a*, 137*b* may correspond to a positive pole and a negative pole such that both first piezoelectric ceramic 134 and second piezoelectric ceramic 136 have a positive pole and negative pole. Applying a voltage across positive electrode 137*a* and negative electrode 137*b* may cause ceramics 134 and 136 to deflect, thereby producing vibrations that act vertically along longitudinal axis 126. In some embodiments, electrodes 137*a*, 137*b* are electrically isolated from additive manufacturing nozzle 116 such that a voltage applied to electrodes 137*a*, 137*b* does not induce an electrical current through additive manufacturing nozzle 116. In some embodiments, both electrodes 137*a*, 137*b* and ceramics 134 and 136 are electrically isolated from the additive manufacturing nozzle 116 such that a circuit is not completed between any element of piezoelectric transducer 132 and additive manufacturing nozzle 116.

Piezoelectric transducer 132 may be configured to cause vibrations along longitudinal axis 126 as described above. In some embodiments, the vibrations of additive manufacturing nozzle 116 caused by piezoelectric transducer 132 along longitudinal axis 126 reduce the viscosity of the print material 108 by utilizing van der Waals forces to manipulate print material 108. For example, when additive manufacturing nozzle 116 vibrates channel 124 of additive manufacturing nozzle 116 that is in contact with print material 108, the van der Waals forces between channel 124 and print material 108 may cause print material 108 to move in response to the vibrations. In some embodiments, a combination of van der Waals forces and boundary layer interactions between print material 108 and channel 124 determine the viscosity of print material 108. For example, the boundary layer condition may cause a higher viscosity near channel 124 and a lower viscosity nearer to the center of channel 124. Similarly, van der Waals forces between individual particles of print material 108 may be affected by the boundary layer conditions. Print material 108 may be vibrated along with the additive manufacturing nozzle 116. This vibration of print material 108 may cause molecular chains in print material 108 to stretch and contract, which causes a significant reduction in viscosity and an increase in flow rate of print material 108. In some embodiments, the molecular chains are stretched and contracted generally along longitudinal axis 126 due to the vibrations acting along longitudinal axis 126.

In some embodiments, piezoelectric transducer 132 is configured to vibrate at an ultrasonic frequency. For example, piezoelectric transducer 132 may be configured to vibrate at ultrasonic frequencies such as 20 kilohertz, 25 kilohertz, 30 kilohertz, and/or any other ultrasonic frequency. It is contemplated that piezoelectric transducer 132 may vibrate at subsonic frequencies without departing from the scope of the present disclosure. In some embodiments, the frequency of piezoelectric transducer 132 is selected based on a length of additive manufacturing nozzle 116. For longer length nozzles 116, the frequency of the piezoelectric transducer 132 may be decreased. For shorter nozzles 116, the frequency may increase. Additionally, the ultrasonic frequency may be selected based on a resonant frequency of additive manufacturing nozzle 116. The resonant frequency of additive manufacturing nozzle 116 may be determined by the physical dimensions (e.g., width, length, density) of additive manufacturing nozzle 116. In some embodiments, length, width, and density may each independently affect the resonant frequency of additive manufacturing nozzle 116. For example, a longer length may decrease the frequency, a higher density may decrease the frequency, and a larger width (i.e., lower mass/length) may decrease the frequency. Alternatively, a shorter length may increase the frequency of additive manufacturing nozzle 116, a lower density may increase the frequency, and a smaller width may increase the frequency.

As previously discussed, vibrations of additive manufacturing nozzle 116 that are not along longitudinal axis 126 (e.g., vibrations perpendicular to the flow of print material 108) may cause additive manufacturing nozzle 116 to deflect away from a programmed print path. Moving away from this programmed print path decreases print quality and may necessitate the additive manufacturing process to be restarted after scrapping a part printed with low quality.

In some embodiments, piezoelectric transducer 132 causes longitudinal vibration along longitudinal axis 126 (as indicated by the arrow) to introduce vibrations into print material 108 through additive manufacturing nozzle 116. Thus, in some embodiments, piezoelectric transducer 132 vibrates along longitudinal axis 126 and codirectional with the flow of print material 108 through additive manufacturing nozzle 116, which is coaxial with piezoelectric transducer 132 as previously discussed. In some embodiments, the vibration of additive manufacturing nozzle 116 causes the print material 108 to vibrate due to van der Waals forces acting between channel 124 and the print material 108. In some embodiments, the vibrations applied to the print material 108 reduce the viscosity of the print material 108 to reduce agglomeration of the print material 108.

In some embodiments, additive manufacturing nozzle 116 is configured to extrude print material 108. Print material 108 may flow from additive manufacturing nozzle 116 onto build surface 104. In some embodiments, print material 108 may comprise a plastic polymer material such as polylactic acid (PLA), acrylonitrile butadiene styrene (ABS), polyvinyl alcohol plastic (PVA), or any other such plastic polymer suitable for additive manufacturing. In some embodiments, print material 108 may comprise a nanocomposite ink, a hydrogel, metallic alloys, pure metals, polymer nanocomposites, thermoset resins (e.g., silicones, epoxies, etc.), or any other material suitable for direct ink write additive manufacturing. In some embodiments, print material 108 may comprise thermoplastics, composites, Acrylonitrile Butadiene Styrene (ABS), Polylactic acid (PLA), Polycarbonate (PC), Polystyrene (PA), lignin, rubber, Polyether Ether Ketone (PEEK), or any other material suitable for fused filament fabrication. In some embodiments, print material 108 may comprise a resin-ceramic slurry.

In some embodiments, print material 108 may comprise one or more filler 142. For example, carbon fibers, carbon nanotubes, or the like may be added to print material 108 to change the properties thereof. In some embodiments, filler 142 may comprise at least 50% of a volume of print material 108. In some embodiments, filler 142 comprises 50% or less of the volume of print material 108. As previously discussed, as the percentage of filler 142 increases, the likelihood of agglomeration of filler 142 may increase, which may lead to printed parts of poor quality. Consequently, the likelihood of clogging increases as the percent volume of filler 142 in print material 108 increases. Accordingly, to mitigate clogging and agglomeration of filler 142, vibrations are applied to print material 108 by piezoelectric transducer 132 as discussed above. Thus, embodiments of the present disclosure enable print material 108 comprising large amounts of filler 142 (e.g., greater than 50% of the overall volume) to be printed in additive manufacturing systems, such as direct ink writing or fused filament fabrication, without sacrificing print quality. In some embodiments, agglomeration of print material 108 may be prevented by applying piezoelectric vibrations and applying heat to print material 108.

In some embodiments, piezoelectric printhead 102 comprises a heating element 144. In some embodiments, additive manufacturing nozzle 116 is coupled to heating element 144. In some embodiments, heating element 144 applies heat to additive manufacturing nozzle 116 to reduce the viscosity of print material 108. In some embodiments, heating element 144 applies heat to additive manufacturing nozzle 116 to melt filament passing through additive manufacturing nozzle 116. In some embodiments, heating element 144 is not present and piezoelectric transducer 132 provides heat to print material 108. In some embodiments, the heat applied to print material 108 by piezoelectric transducer 132 lowers the viscosity of print material 108.

In some embodiments, heating element 144 is separate from additive manufacturing nozzle 116. In some embodiments, heating element 144 may be integrated into piezoelectric transducer 132. In some embodiments, heating element 144 is coupled to additive manufacturing nozzle 116 and piezoelectric transducer 132 is thermally shielded or insulated from heating element 144 by a protective coating, an insulation barrier, an air gap, and/or any other such thermal insulation method to mitigate overheating or otherwise damaging piezoelectric transducer 132.

In some embodiments, piezoelectric transducer 132 is thermally insulated from additive manufacturing nozzle 116 and/or heating element 144. For example, piezoelectric printhead 102 may comprise insulation 146 between additive manufacturing nozzle 116 and piezoelectric transducer 132. In some embodiments, insulation 146 comprises a layer of material disposed between additive manufacturing nozzle 116 and piezoelectric transducer 132. In some embodiments, medial section 122 is coated in a thermally insulated material such as ceramic, fiberglass, or any other such thermally insulating material. In some embodiments, insulation 146 is an airgap that may be filled with thermal-insulating gasses or liquids. The gasses or liquid may be circulated to provide cooling as will be appreciated by one of skill in the art. Further, insulation 146 between piezoelectric transducer 132 and additive manufacturing nozzle 116 may be filled with carbon dioxide, ethylene, oxygen, water vapor, air, and/or any other thermally insulating gas or any combination thereof. In some embodiments, insulation 146 is configured to protect piezoelectric transducer 132 from thermal damage. For example, the heat applied to the additive manufacturing nozzle 116 by heating element 144 may cause permanent warping of piezoelectric transducer 132, thereby causing the piezoelectric ultrasonic vibrations to be applied at an angle with respect to longitudinal axis 126. This angle may cause print material 108 to agglomerate within additive manufacturing nozzle 116. Accordingly, the use of insulation 146 between additive manufacturing nozzle 116 and piezoelectric transducer 132 may prevent damage to piezoelectric transducer 132 such that the applied vibrations may remain in-line with additive manufacturing nozzle 116.

Additive Manufacturing Device

Additive manufacturing device 106 may comprise a pressurizing reservoir 148 coupled to auger 150. In some embodiments, auger 150 is directly coupled to an additive manufacturing device gantry 112 of additive manufacturing device 106. Piezoelectric printhead 102 may be coupled (e.g., in fluid communication) to auger 150 via mounting head 118 such that print material 108 may flow through both auger 150 and piezoelectric printhead 102. In some embodiments, additive manufacturing device gantry 112 controls movement of auger 150 and piezoelectric printhead 102 along a predetermined print path to additively manufacture 3D-structure 110. In some embodiments, additive manufacturing device gantry 112 is configured to provide one-, two-, three-, four-, five-, or six-axis movement of auger 150 and/or piezoelectric printhead 102.

In some embodiments, build surface 104 is part of additive manufacturing device 106. In some embodiments, build surface 104 is disposed proximate additive manufacturing device 106 and particularly, proximate additive manufacturing device gantry 112, auger 150, and/or piezoelectric printhead 102 or any combination thereof. In some embodiments, additive manufacturing device 106 receives commands from computer 114 to move piezoelectric printhead 102 and deposit print material 108 on build surface 104. Build surface 104 may comprise a non-conductive material such as ceramic, ceramic-coated metal, plastic, silicone-coated metal, or any other such heat resistant and/or non-conductive material. In some embodiments, build surface 104 comprises a conductive surface such as a metal. In some embodiments, build surface 104 may be textured to increase the surface area of build surface 104, which in turn increases the grip of build surface 104. The increased surface area of build surface 104 increases adhesion of a print material extruded through additive manufacturing nozzle 116.

In some embodiments, piezoelectric printhead 102 is mounted directly to an auger 150. In some embodiments, auger 150 is configured to apply a constant downward pressure to print material 108. In some embodiments, the downward pressure applied to print material 108 causes print material 108 to be pushed into additive manufacturing nozzle 116, whereby print material 108 may be deposited out of medial section 122. In some embodiments, auger 150 may be electronically operated by a motor. In some embodiments, auger 150 may be operated by a gear or a driveshaft coupled to an external motor. In some embodiments, auger 150 is not present and print material 108 may be fed directly into piezoelectric printhead 102 via mounting head 118. In some embodiments, auger 150 is fed by a pressurizing piston. Generally, any method for providing print material to piezoelectric printhead 102 is within the scope hereof.

In some embodiments, print material 108 is stored in pressurizing reservoir 148. In some embodiments, pressurizing reservoir 148 comprises a piston configured to apply pressure to print material 108. In some embodiments, the pressure applied to print material 108 forces print material 108 through a fluid channel 152 connecting pressurizing reservoir 148 and auger 150. In some embodiments, pressurizing reservoir 148 is directly connected to piezoelectric printhead 102 and auger 150 is not present. In some embodiments, fluid channel 152 directly connects pressurizing reservoir 148 to piezoelectric printhead 102. In some embodiments, pressurizing reservoir 148 may comprise an air pump for pumping pressurized air into pressurizing reservoir 148. In some embodiments, the air pump replaces the piston and provides a pressurizing force to print material 108. In some embodiments, the air pump fills any empty space in pressurizing reservoir 148 with pressurized air. In some embodiments, the pressurized air provides a constant force to print material 108 such that print material 108 is forced through fluid channel 152.

In some embodiments, system 100 may comprise computer 114. In some embodiments, computer 114 is a mobile device such as a cellphone, a tablet computer, a smart watch, or any other such mobile device. In some embodiments, computer 114 is a virtual reality headset. In some embodiments, computer 114 comprises at least one non-transitory computer-readable memory storing computer-executable instructions executable by at least one processor 154. In some embodiments, processor 154 comprises a controller, such as a microcontroller. In some embodiments, the computer-executable instructions cause processor 154 to perform a method of additive manufacturing as discussed below with respect to FIGS. 2 and 3. In some embodiments, computer 114 comprises a user input device such as a mouse and keyboard, a touch pad, a yoke, a joystick, switches, a touch screen, or any other such user input device. In some embodiments, computer 114 comprises a display for displaying computer information and user interfaces to a user. In some embodiments, computer 114 comprises electronic sensors and equipment such as, a voltmeter, an ammeter, an oscilloscope, a DC power supply, an ohmmeter, a signal generator, and/or any other such electronics test equipment or any combination thereof.

In some embodiments, additive manufacturing device 106 may be controlled by computer 114 and/or piezoelectric transducer 132 may be electronically controlled by computer 114. In some embodiments, computer 114 applies a voltage across piezoelectric transducer 132 to actuate the piezoelectric ceramic within piezoelectric transducer 132, thereby vibrating additive manufacturing nozzle 116. In some embodiments, computer 114 transmits commands to piezoelectric printhead 102 that may cause piezoelectric printhead 102 to apply heat to additive manufacturing nozzle 116, apply a piezoelectric vibration to additive manufacturing nozzle 116, report a temperature of additive manufacturing nozzle 116 to computer 114, and/or any other action without departing from the scope of the present disclosure.

In some embodiments, computer 114 is communicatively coupled to additive manufacturing device 106 via a wired connection 156, such as over USB, LAN, optical fiber, or any other wired communication standard/protocol. In some embodiments, computer 114 is communicatively coupled to additive manufacturing device 106 via a wireless connection, such as WIFI, BLUETOOTH, satellite, radio, infrared, microwave, or any other wireless communication method.

Figure 2:
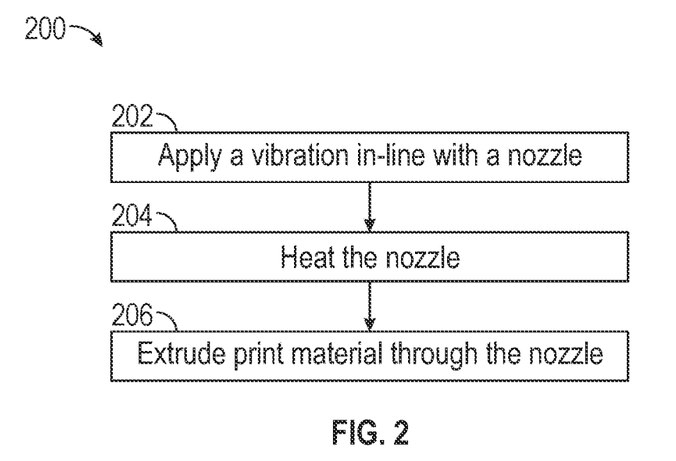
FIG. 2 illustrates a method for additive manufacturing using the piezoelectric printhead for some embodiments.

FIG. 2 illustrates method 200 for additive manufacturing using piezoelectric printhead 102 for some embodiments. In some embodiments, method 200 may be employed by fully automated additive manufacturing devices such as additive manufacturing device 106. In some embodiments, method 200 may be employed in fused filament fabrication (FFF), direct ink writing (DIW), multi-jet-modeling (MJM), and/or any other such additive manufacturing method. In some embodiments, method 200 may comprise any or all of the following steps.

In some embodiments, method 200 comprises step 202 where vibrations may be applied to additive manufacturing nozzle 116 via piezoelectric transducer 132. In some embodiments, step 202 comprises applying piezoelectric vibrations along longitudinal axis 126 such that print material 108 flowing through additive manufacturing nozzle 116 is vibrated, thereby preventing agglomeration of print material 108 and reducing the viscosity of print material 108. In some embodiments, piezoelectric transducer 132 and additive manufacturing nozzle 116 are coupled coaxially which allows piezoelectric transducer 132 to apply the piezoelectric vibration in line with additive manufacturing nozzle 116. In some embodiments, the orientation of piezoelectric transducer 132 allows for print material 108 to flow through channel 124 while receiving piezoelectric vibrations from piezoelectric transducer 132 along longitudinal axis 126.

The applied vibrations may cause van der Waals forces between channel 124 and print material 108 to stretch and compress polymeric chains in print material 108. In some embodiments, the stretching and compressing of the polymeric chains causes print material 108 to decrease in viscosity, which prevents agglomeration of the polymeric chains present in print material 108. In some embodiments, the reduction in viscosity of print material 108 aids in depositing print material 108 onto build surface 104. In some embodiments, the reduction of viscosity reduces the overall heating necessary for the additive manufacturing process, which may be useful in additive manufacturing processes such as FDM. For example, the vibrations from piezoelectric transducer 132 generate heat that may be transferred to print material 108, which causes print material 108 to require less overall heating for FDM.

Next, at step 204, the additive manufacturing nozzle 116 may be heated. In some embodiments, additive manufacturing nozzle 116 is heated using heating element 144. In some embodiments, additive manufacturing nozzle 116 is heated via residual heat caused by vibrations from piezoelectric transducer 132. In some embodiments, step 204 comprises applying heat to additive manufacturing nozzle 116 from both heating element 144 and piezoelectric transducer 132. In some embodiments, the heat applied to additive manufacturing nozzle 116 reduces viscosity of print material 108 that is flowing through additive manufacturing nozzle 116. In some embodiments, step 204 may be initiated by computer 114. In some embodiments, step 204 comprises monitoring the temperature of additive manufacturing nozzle 116 (or piezoelectric printhead 102 as a whole) to prevent overheating of additive manufacturing nozzle 116. In some embodiments, the temperature of additive manufacturing nozzle 116 is monitored by a temperature sensor (not shown) coupled to additive manufacturing nozzle 116 or otherwise located within system 100 and configured to measure temperature within piezoelectric printhead 102.

In some embodiments, method 200 comprises step 206 where print material 108 may be extruded through additive manufacturing nozzle 116. In some embodiments, print material 108 may be extruded through additive manufacturing nozzle 116 and extruding end 120. In some embodiments, print material 108 is extruded through additive manufacturing nozzle 116 and deposited on build surface 104.

In some embodiments, method 200 may comprise additional steps not specifically discussed herein. For example, method 200 may comprise additional steps directed to moving piezoelectric printhead 102 along a print path to extrude print material 108 onto build surface 104. As another example, method 200 comprises steps directed to pressurizing print material 108 within pressurizing reservoir 148 such that print material 108 is pushed through auger 150 and additive manufacturing nozzle 116.

Automated Tool Touch-Off

Reference is again made to FIGS. 1A and 1B. In some embodiments, piezoelectric printhead 102 is configured to perform automated tool touch-off for system 100. In contrast to typical tool touch-off systems that rely on conductive nozzles and build plates or pads on the build plates, embodiments of the present disclosure may automate tool touch-off with non-conductive nozzle tips and/or non-conductive build plates by using piezoelectric transducer 132. In some embodiments, the automated tool touch-off can be used to set Z-zero, which indicates an origin point in the Z-axis for the coordinate system of system 100. Z-zero may be set using piezoelectric printhead 102. For example, piezoelectric printhead 102 is configured to move downward to contact piezoelectric transducer 132 with build surface 104. Contacting build surface 104 with piezoelectric transducer 132 causes piezoelectric transducer 132 to compress or deflect, which induces a voltage in piezoelectric transducer 132. In response to this voltage, computer 114 may set Z-zero (i.e., the location of a top surface of build surface 104 in the vertical Z dimension). In some embodiments, computer 114 stores Z-zero in non-transitory computer-readable memory. Additive manufacturing device 106 may then use the Z-zero value to construct the base layer and subsequent layers with Z-dimensional accuracy. In some embodiments, Z-zero may be used to determine a height of build surface 104.

Figure 3:
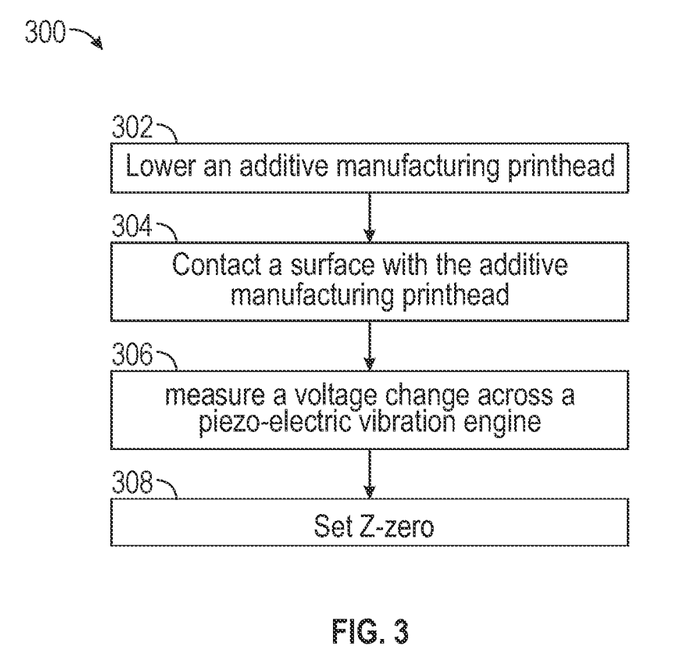
FIG. 3 illustrates a method for tool touch-off for an additive manufacturing device using the piezoelectric printhead for some embodiments.

FIG. 3 illustrates method 300 for automating tool touch-off for an additive manufacturing device using piezoelectric printhead 102 for some embodiments. In some embodiments, Z-zero is set by piezoelectric printhead 102 instead of by a standoff or probe. By using the printhead to set the Z-zero, the accuracy may be increased by using piezoelectric printhead 102 as the touch-off probe. Separation of the touch-off probe and the printhead may lead to inaccuracies of Z-zero if the touch-off probe is bent, warped, defective, and/or possesses any other such defect. Furthermore, piezoelectric printhead 102 may allow for touch-off to be performed on any surface, whether conductive or non-conductive.

In some embodiments, method 300 comprises step 302 in which additive manufacturing nozzle 116 may be lowered to contact build surface 104. In some embodiments, additive manufacturing nozzle 116 is lowered by additive manufacturing device gantry 112. In some embodiments, build surface 104 is raised to meet additive manufacturing nozzle 116. In some embodiments, additive manufacturing nozzle 116 may be positioned at any Z-position relative to build surface 104 before being lowered to build surface 104. In some embodiments, the Z-position of additive manufacturing nozzle 116 is stored in computer-readable memory prior to step 302. In some embodiments, step 302 comprises monitoring a position of additive manufacturing nozzle 116 as additive manufacturing nozzle 116 is moved. In some embodiments, the lowering motion is initiated and controlled by a computer system such as computer 114. In some embodiments, processor 154 may issue control signals to additive manufacturing device 106 that cause additive manufacturing device 106 to perform step 302.

In some embodiments, method 300 comprises step 304 in which additive manufacturing nozzle 116 may contact build surface 104. In some embodiments, upon contacting build surface 104, the physical impact of contacting additive manufacturing nozzle 116 and build surface 104 causes piezoelectric transducer 132 to vibrate. This vibration generates a piezoelectric voltage within piezoelectric transducer 132 that may be used as an indication to set Z-zero. In some embodiments, the voltage generated may be an increase in voltage. In some embodiments, the voltage generated may be a decrease in voltage.

In some embodiments, method 300 comprises step 306 in which a voltage across piezoelectric transducer 132 resulting from contacting additive manufacturing nozzle 116 with build surface 104 may be detected. In some embodiments, the voltage is detected in response to contacting build surface 104. In some embodiments, the voltage may be detected by a sensor (e.g., a voltage sensor) present anywhere within system 100. In some embodiments, processor 154 is configured to detect the increase in voltage resulting from contacting additive manufacturing nozzle 116 with build surface 104.

In response to reading this voltage, at step 308, computer 114 may set the current Z-coordinate of additive manufacturing nozzle 116 as Z-zero, which may be stored in computer-readable memory. In some embodiments, the Z-coordinate of additive manufacturing nozzle 116 stored in computer-readable memory is used to set Z-zero of build surface 104. In some embodiments, the detection of the voltage change causes a control signal to be generated indicating to computer 114 to set Z-zero. The control signal may also prevent further downward movement of additive manufacturing nozzle 116 to prevent further contact between additive manufacturing nozzle 116 and build surface 104 during the additive manufacturing process. It is contemplated that tool touch-off may be required to recalibrate after additive manufacturing of 3D-structure 110 has begun.

In some embodiments, method 300 further comprises steps directed to monitoring for a voltage change across piezoelectric transducer 132. In some embodiments, the tool touch-off may be performed to determine a Z-coordinate of build surface 104 at various locations thereon, such as when build surface 104 is oriented at an angle with respect to the horizontal. In some embodiments, inherent background noise of piezoelectric transducer 132 caused by inherent changes and fluctuations in voltage is monitored for a voltage change greater than the inherent background noise. In some embodiments, the voltage change compared to the background noise level is recorded and stored in non-transitory computer-readable memory for access by processor 154 later. In some embodiments, the voltage may be used to refine determination of Z-zero of build surface 104 by analyzing the voltage change for the exact moment of contact. In some embodiments, the voltage change compared to the background noise level may be analyzed by a machine learning program stored on non-transitory computer-readable media to determine when additive manufacturing nozzle 116 contacts build surface 104. In some embodiments, Z-zero is recorded by recording the elapsed time between the beginning of movement from step 302 and contacting build surface 104 in step 304. In some embodiments, Z-zero may be verified/confirmed after it is set. In some embodiments, Z-zero may be inaccurate and may need to be reset. In some embodiments, step 308 may be performed multiple times to determine Z-zero.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A system for additive manufacturing, comprising:
a piezoelectric printhead having a length along a vertical axis, comprising:
a piezoelectric transducer comprising a plurality of piezoelectric ceramics configured to cause a longitudinal vibration along the vertical axis; and
a nozzle comprising a mounting head, a medial section, and an extruding end,
wherein the plurality of piezoelectric ceramics is provided in an alternating arrangement of positive and negative electrodes; and
a plurality of electrical insulators disposed between each piezoelectric ceramics of the plurality of piezoelectric ceramics,
wherein the medial section comprises a proximal end and a distal end, the proximal end connected to the mounting head,
wherein the nozzle is oriented along the vertical axis and the medial section is disposed through the plurality of piezoelectric ceramics,
wherein the extruding end is directly connected to the distal end of the medial section adjacent a piezoelectric ceramics of the plurality of piezoelectric ceramics,
wherein the nozzle is configured to receive and extrude a print material by the extruding end along the vertical axis such that a first direction of the print material is in-line with a second direction of vibrations of the plurality of piezoelectric ceramics, and
a controller associated with an additive manufacturing device, wherein the controller is configured to:
position the piezoelectric printhead to contact a print surface; and
responsive to detecting a voltage increase caused by the nozzle contacting the print surface, set a reference value corresponding to a position of the nozzle upon detecting the voltage increase.

2. The system of claim 1, wherein the plurality of piezoelectric ceramics vibrates ultrasonically.

3. The system of claim 1, wherein the print material is a polymer material comprising a filler.

4. The system of claim 3, wherein the piezoelectric printhead further comprises a heating element coupled to the nozzle, the heating element configured to apply heat to the nozzle to reduce a viscosity of the print material.

5. The system of claim 1, wherein vibrating along the vertical axis causes van der Waals forces and boundary layer interactions between the nozzle and the print material to stretch and compress polymeric molecular chains within the print material, thereby reducing viscosity of the print material.

6. The system of claim 1,
wherein the nozzle comprises an electrically non-conductive tip, and
wherein the print surface is electrically non-conductive.

7. The system of claim 1, wherein the piezoelectric printhead is configured to be coupled to a gantry of the additive manufacturing device.

8. A method for additive manufacturing, comprising:
providing a piezoelectric printhead, comprising:
a piezoelectric transducer comprising a plurality of piezoelectric ceramics configured to cause a longitudinal vibration along a vertical axis, each piezoelectric ceramic of the plurality of piezoelectric ceramics comprising a bore extending along the vertical axis,
wherein the plurality of piezoelectric ceramics is provided in an alternating arrangement of positive and negative electrodes;
a plurality of electrical insulators disposed between each piezoelectric ceramics, and
a nozzle oriented along the vertical axis and disposed through the plurality of piezoelectric ceramics, the nozzle comprising:
an extruding end protruding from the plurality of piezoelectric ceramics and configured to deposit a print material onto a print surface;
a mounting end configured to mount to an additive manufacturing device; and
a medial section comprising a proximal end and a distal end, wherein the extruding end is coupled to the distal end adjacent a piezoelectric ceramic of the plurality of piezoelectric ceramics, and the mounting end is coupled to the proximal end,
positioning, by a controller, the piezoelectric printhead to contact the print surface;
in response to the piezoelectric printhead contacting the print surface, determining a voltage increase across the plurality of piezoelectric ceramics, the voltage increase resulting from contacting the print surface; and
in response to the voltage increase, setting, by the controller, a position value indicating a current height of the piezoelectric printhead relative to the print surface.

9. The method of claim 8, wherein determining the voltage increase comprises:
monitoring the plurality of piezoelectric ceramics for changes in voltage compared to a background noise level; and
storing the changes in the voltage compared to the background noise level in non-transitory computer-readable memory.

10. The method of claim 8,
wherein the plurality of piezoelectric ceramics operates at an ultrasonic frequency, and
wherein the ultrasonic frequency is selected based on a resonant frequency of the nozzle.

11. The method of claim 8, further comprising:
receiving the print material in the nozzle; and
depositing the print material on the print surface.

12. The method of claim 8, further comprising applying a vibration to the nozzle by the plurality of piezoelectric ceramics.

13. The method of claim 8,
wherein the print surface and the extruding end of the nozzle are electrically non-conductive.

14. A system for additive manufacturing, comprising:
a nozzle comprising a mounting head, a medial section, and an extruding end;
a piezoelectric transducer comprising a plurality of piezoelectric ceramics configured to cause longitudinal vibration along a vertical axis thereof, each piezoelectric ceramic of the plurality of piezoelectric ceramics comprising a bore extending along the vertical axis,
wherein the plurality of piezoelectric ceramics is provided in an alternating arrangement of positive and negative electrodes; and
a plurality of electrical insulators disposed between each piezoelectric ceramic of the plurality of piezoelectric ceramics along the medial section;

wherein the medial section comprises a proximal end and a distal end, the proximal end coupled to the mounting head, wherein the nozzle is oriented along the vertical axis and the medial section is at least partially disposed within the bore of the plurality of piezoelectric ceramics, wherein the extruding end is directly coupled to the distal end of the medial section adjacent a piezoelectric ceramic of the plurality of piezoelectric ceramics, wherein the nozzle is configured to deposit print material by the extruding end along the vertical axis such that a first direction of the print material is in-line with a second direction of vibrations of the plurality of piezoelectric ceramics, and wherein the longitudinal vibration caused by the plurality of piezoelectric ceramics prevents agglomeration of the print material while the print material is received within the nozzle.

15. The system of claim 14,
wherein the plurality of piezoelectric ceramics is oriented symmetrically about a perimeter of the nozzle to provide vibrations in-line with the nozzle.

16. The system of claim 14, further comprising at least one heating element coupled to the nozzle to heat print material extruded through the nozzle.

17. The system of claim 16,
wherein the plurality of piezoelectric ceramics is thermally insulated from the nozzle.

18. The system of claim 14, wherein the plurality of piezoelectric ceramics is electronically controlled by a computer system communicatively coupled to an additive manufacturing device.

19. The system of claim 14, wherein the extruding end is connected to the medial section by threading the extruding end into the bore of the plurality of piezoelectric ceramics.

* * * * *